United States Patent
Löcker et al.

(10) Patent No.: US 6,811,820 B2
(45) Date of Patent: Nov. 2, 2004

(54) FRICTION LINING FOR WET RUNNING

(75) Inventors: Klaus Dieter Löcker, Altmünster (AT); Gerhard Hartner, Bad Wimsbach (AT); Günter Mikolasch, Vienna (AT); Peter Schnell, Grieskirchen (AT); Franz Maier-Lehner, Taufkirchen a.d.Trattnach (AT); Johann Oisser, Linz (AT); Rüdiger Spaun, Linz (AT)

(73) Assignees: Miba Frictec GmbH, Laakirchen (AT); part interest; Hexcel Corporation, Stamford, CT (US); part interest ( * ) Notice: Subject to any disclaimer, the term of this patent is extended or adjusted under 35 U.S.C. 154(b) by 0 days.

(21) Appl. No.: 10/149,638

(22) PCT Filed: Dec. 13, 2000

(86) PCT No.: PCT/AT00/00338

§ 371 (c)(1),
(2), (4) Date: Oct. 3, 2002

(87) PCT Pub. No.: WO01/44678

PCT Pub. Date: Jun. 21, 2001

(65) Prior Publication Data

US 2003/0104736 A1 Jun. 5, 2003

(30) Foreign Application Priority Data

Dec. 13, 1999 (AT) .............................................. 2090/99

(51) Int. Cl.⁷ ................................................ B05D 3/12

(52) U.S. Cl. ........................ 427/350; 427/348; 427/355; 427/358; 427/368; 427/369; 427/389.9; 427/394

(58) Field of Search ................................. 427/348, 350, 427/355, 358, 368, 369, 389.9, 394; 442/101; 428/408, 409

(56) References Cited

U.S. PATENT DOCUMENTS

| | | |
|---|---|---|
| 4,490,201 A | 12/1984 | Leeds |
| 5,436,045 A | 7/1995 | Fruitman |
| 5,662,993 A | 9/1997 | Winckler |
| 5,858,511 A * | 1/1999 | Lisowsky .................... 428/167 |
| 5,895,716 A * | 4/1999 | Fiala et al. .................. 428/408 |

FOREIGN PATENT DOCUMENTS

| | | |
|---|---|---|
| EP | 0 787 759 | 8/1997 |
| EP | 0 943 832 | 9/1999 |
| JP | 1269735 | 10/1989 |
| JP | 2134427 | 5/1990 |

* cited by examiner

Primary Examiner—Cathy Lam
(74) Attorney, Agent, or Firm—Collard & Roe, P.C.

(57) ABSTRACT

A friction lining for wet running consists of a fabric which can be applied to a carrier (6) and is partly impregnated with resin. In order to provide favorable friction conditions it is proposed that the porosity of the fabric (1) impregnated with resin is higher in the zone of the friction face (4) by a lower resin content in a surface layer (h) than in the remaining layer.

6 Claims, 1 Drawing Sheet

FRICTION LINING FOR WET RUNNING

CROSS REFERENCE TO RELATED APPLICATIONS

Applicants claim priority under 35 U.S.C. §119 of Austria Application No. A2090/99 filed Dec. 13, 1999. Applicants also claim priority under 35 U.S.C. §365 of PCT/AT00/00338 filed Dec. 13, 2000. The international application under PCT article 31(2) was not published in English.

BACKGROUND OF THE INVENTION

The invention relates to a friction lining for wet running, consisting of a fabric which can be applied to a carrier and is partly impregnated with resin, as well as to a method for producing such a friction lining.

DESCRIPTION OF THE PRIOR ART

In order to achieve an advantageous porosity for receiving and conducting the respectively used lubricating liquid in the case of friction linings made of a fabric consisting of carbon fibers and partly impregnated with resin, it is known (U.S. Pat. No. 5,662,993 A) to limit the resin share to 18 to 40%. Despite this limitation of the resin share, comparably high hydrodynamic friction shares are obtained which reduce the coefficient of friction because the hardening of such friction linings occurs in heating presses which produce a resin accumulation in the surface region in order to reduce their operationally induced settling tendency, which can lead to surface regions with a substantially coherent resin film which allows the local build-up of a hydrodynamic lubricant film in the zone of the later friction face. Despite the pressing of the friction linings during the hardening of the resin, the porosity of the friction linings required for taking up the lubricating liquid produces a setting of the friction linings which progresses over the service life due to the operationally induced pressure strains, which entails a reduction of the pore volume. This setting inclination increases with decreasing resin content, so that the resin content should be increased for reducing the setting behavior of such a friction lining. This is contrary to the demand for a sufficient porosity of the friction lining for receiving lubricating liquid.

SUMMARY OF THE INVENTION

The invention is thus based on the object of providing a friction lining of the kind mentioned above in such a way that on the one hand the demand for the lowest possible hydrodynamic friction share can be fulfilled, and on the other hand the setting tendency can be reduced as far as possible.

The invention achieves the object in such a way that the porosity of the fabric impregnated with resin is higher in the zone of the friction face by a lower resin content in a surface layer than in the remaining layer.

The invention is based on the finding that the relatively high porosity which is relevant for the frictional behavior merely needs to be ensured in a surface layer of the friction face. The porosity of the remaining layer of the friction lining, however, hardly plays any role for the frictional behavior at all. This means that at a comparably high share of resin and the thus resulting lower porosity, a favorable frictional behavior can be achieved when a sufficiently high porosity in a surface layer is striven for by a respectively lower resin content. As a result of this measure, the otherwise mutually contradicting requirements of a favorable discharge of the lubricating liquid by the friction face and of the lowest possible setting behavior can be fulfilled in an advantageous manner. It was noticed surprisingly that neither the higher resin content with the thus resulting lower porosity of the friction lining outside of the surface layer of the friction lining can have a disadvantageous effect on the frictional behavior, nor can the porous layer of the friction face close to the surface with the lower resin content have a disadvantageous effect on the setting behavior. This leads to the consequence that in comparison with the state of the art overall higher resin contents can be employed without having to fear any reduction of the coefficients of friction.

Different methods can be employed to reduce the resin content for achieving a higher porosity in a surface layer of a friction lining whose fabric has been saturated partly with liquid resin and was subjected to a pressing pressure during the hardening of the resin. One possibility is that the resin is partly mechanically removed again in the zone of the friction face after the hardening. This mechanical resin removal at least partly uncovers the surface fibers of the fabric and removes locally bound resin layers, which leads to an advantageous structured friction face which as a result of its structuring is provided with the porosity needed for draining off the lubricating film. The mechanical removal of the resin can be achieved by a brushing of the friction face. It is also possible grind out the resin from the zone of the friction face or to use sandblasting for this purpose.

In order to reduce the resin content in a surface layer of the friction face it is not necessary to mechanically remove the resin retroactively. It is also possible to suck off the resin during the pressing of the impregnated fabric from the surface region of the friction face, e.g. with the help of a suction film which is placed on the fiber layer saturated with resin prior to the hardening of the resin and is subjected to a pressing pressure jointly with the fabric, so that the resin which is still sufficiently capable of flowing is pushed from the layer adjacent to the suction film into the pores of the suction film. After the pressing process and the hardening of the resin the resin saturated suction film can be drawn off from the friction face, whereby the released surface layer of the friction lining shows a considerably lower resin content than the remaining friction lining layer.

BRIEF DESCRIPTION OF THE DRAWINGS

The subject matter of the invention is shown by way of examples in the drawings, wherein.

DETAILED DESCRIPTION OF THE PREFERRED EMBODIMENTS

Figure 1:
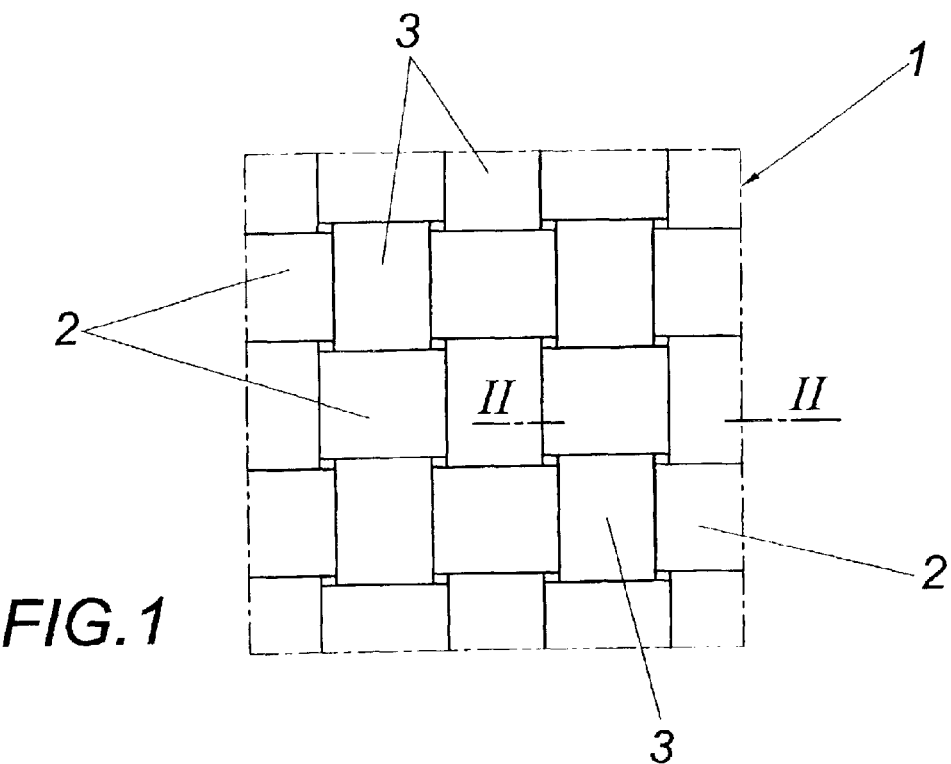
FIG. 1 shows a friction lining in accordance with the invention in a sectional top view.
Figure 2:
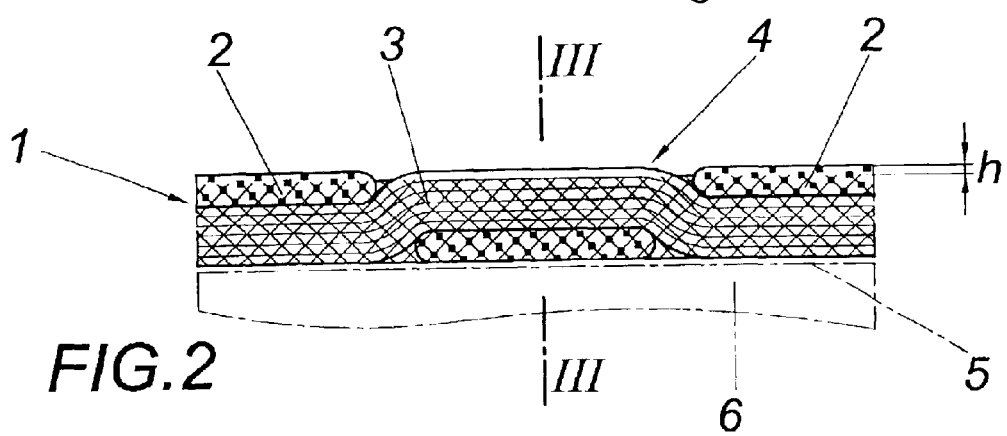
FIG. 2 shows said friction lining in a sectional view along line II—II in FIG. 1 on an enlarged scale.
Figure 3:
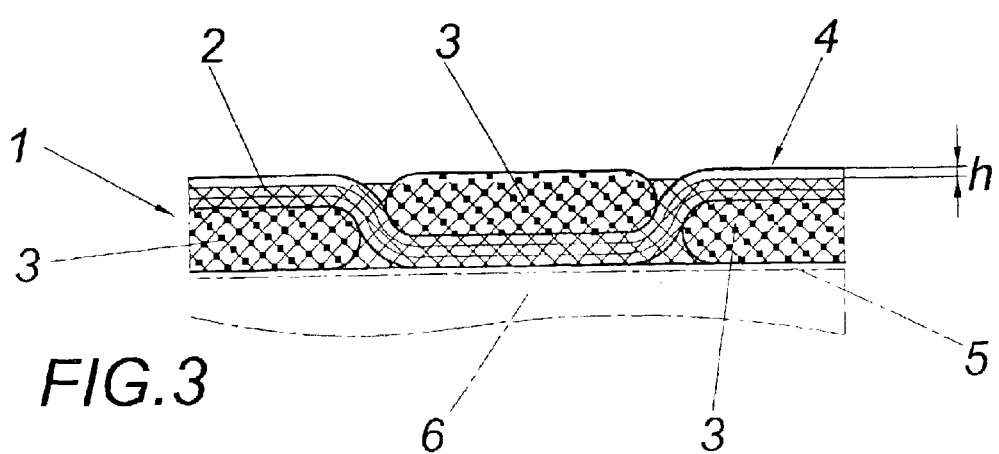
FIG. 3 shows a sectional view along line III—III of FIG. 2.

According to the illustrated embodiment the friction lining comprises a fabric 1 made of carbon fibers in a linen weave, with the warp threads being designated with reference numeral 2 and the weft threads with reference numeral 3. Said warp and weft threads 2, 3 each consist of a plurality of filaments which are not twisted, however. After an impregnation of the fabric with resin, at least the friction face 4 is substantially relieved in a surface layer h of resin, which occurs either mechanically or by sucking off by means of a suction film. In said surface layer h, which comprises a thickness of 0.002 to 0.050 mm, preferably 0.003 to 0.005 mm, the resin content is between 0 to 12%. In the remaining layer zone of the fabric 1 the resin content, which is indicated in FIGS. 2 and 3 by the crosshatching, is between 40 and 70%, preferably between 45 and 60%. As a result of the low resin share in the surface layer h, a surface structure is obtained which is advantageous for the friction lining, both with respect to frictional behavior as well as with respect to the guidance of the lubricating liquid.

It is understood that the invention is not limited to the arrangement of the illustrated friction lining. The friction lining could be arranged in several layers, so that the fabric 1 is applied to at least one further layer, e.g. a layer of non-woven material. As a result of said additional layer, it would be possible for example to influence the sound transmission properties or the heat insulation of the friction lining. Notice should be taken in this connection that the high resistance to heat of the preferably used carbon fibers of fabric 1 allows a higher heat strain of the friction lining when as a result of said higher heat burden the bonding of the friction lining with respect to the friction lining carrier is not endangered. The heat strain on the bonding layer 5 between the friction lining and the friction lining carrier 6 can be limited through a heat-insulating intermediate layer.

The structure of the fabric 1 can be diverse, namely both with respect to the employed fibers as well as the type of weave. Although very different fibers can be used in special cases, highly modular aramide fibers with a length-related mass of 22 to 158 tex and glass fibers made of E-glass with a strength of 22 to 300 tex are the fibers of choice. Carbon fibers on the basis of polyacryl nitrile of high strength are particularly suitable. Non-twisted fiber bunches with 1000 to 6000 filaments, preferably 3000 filaments, are preferred. Favorably suitable for the fabrics are linen, sateen or double milled twill weaves with a mass per unit area of between 80 and 400 g/m$^2$, preferably 170 to 250 g/m$^2$.

Suitable resins are both duroplastic materials such as epoxy, phenol, polyurethane or polyamide resins as well as thermoplastic materials such as polysulfones, polyether imides or polyether ketones. Out of all possible resins, duroplastic materials on the basis of epoxy or phenole resins have proven to be particularly suitable.

The treatment temperature during the impregnation of the fibers must be chosen depending on the respective second order transition temperature, which should be higher than 120° C., preferably higher than 140° C. It is understood that the employed resins can be provided, depending on the respective application, with different additives serving various purposes, e.g. for influencing the viscosity or strength.

In order to produce a friction lining in accordance with the invention, a respective fabric 1 is impregnated at first with resin, namely with the help of a resin solution, a resin melt or a resin film. After a partial hardening of the resin, a suction film is applied to the later friction face 4 in a preferred embodiment of the invention. Suitable suction films are especially fabrics made of polyester or polyamide threads in a linen weave with a mass per unit area of 50 to 120 g/m$^2$. The friction lining with the suction film is then subjected in a second treatment stage to a respective temperature treatment in order to ensure a complete hardening of the resin. In said second treatment stage, the friction lining can be held under a pressing pressure of 1 to 10 bars for example. On drawing off the suction film saturated with the resin a major part of the resin is removed from the surface layer h of the friction lining. The resin removal can also occur without the use of a suction film by brushing, grinding or sandblasting of the hardened surface of the friction lining.

EXAMPLE OF AN EMBODIMENT

A commercially available fabric made of carbon fibers (of high strength, 3000 filaments) in linen weave with a mass per unit area of 200 g/m$^2$ was impregnated with an epoxy resin on the basis of bisphenole-A and a hardening agent on the basis of methylene dianiline. In the employed impregnating unit the solvent was eliminated and the fabric impregnated with the resin was partly hardened at a temperature of 180° C. The fabric treated with resin in this manner had a mass per unit area of 377 g/m$^2$ at a second order transition temperature of less than 100° C. Thereafter a suction film made of polyamide fibers with a mass per unit area of 65 g/m$^2$ was applied on the fabric, namely on both sides, and the fabric with the suction films was subjected in a press to a pressure of 3 bars at a temperature of 160° C. during a period of 4 hours. After the hardening of the resin, the suction films were drawn off. As a result of the partial resin removal on the surface facing the friction lining carrier, the bonding of the bonding layer between the friction lining and the friction lining carrier can be improved.

The produced friction lining showed a mass unit per area of 345 g/m$^2$ with a second order transition temperature of 140° C.

What is claimed is:

1. A method for producing a porous wet friction lining having a friction face and consisting of a fabric which can be applied to a carrier, comprising the steps of
   (a) partly saturating the fabric with a liquid resin at a temperature higher than 120° C.,
   (b) hardening the resin on the fabric, and
   (c) mechanically removing the hardened resin from a surface layer of the friction face to lower the resin content of the surface layer whereby the fabric has a higher porosity in the friction face.
2. The method of claim 1, wherein the resin is hardened on the fabric under pressure.
3. The method of claim 1, wherein the hardened resin is removed by brushing out.
4. The method of claim 1, wherein the hardened resin is removed by grinding out.
5. The method of claim 1, wherein the hardened resin is removed by sandblasting.
6. A method for producing a porous wet friction lining having a friction face and consisting of a fabric which can be applied to a carrier, comprising the steps of
   (a) partly saturating the fabric with a liquid resin,
   (b) partially hardening the resin under pressure,
   (c) applying a suction film to the friction face to suck the partially hardened resin from a surface layer of the friction face to lower the resin content of the surface layer whereby the fabric has a higher porosity in the friction face, and
   (d) subjecting the partially hardened resin in a second treatment stage to a temperature causing complete hardening of the resin.

* * * * *